Nov. 18, 1969 — R. HETMANN — 3,478,834
VEHICLE DRIVING UNIT
Filed Jan. 13, 1967

INVENTOR
Richard HETMANN
By
*Dickens & Craig*
his ATTORNEYS

United States Patent Office 3,478,834
Patented Nov. 18, 1969

---

3,478,834
VEHICLE DRIVING UNIT
Richard Hetmann, Tamm, Wurttemberg, Germany, assignor to Dr. Ing. H.c.F. Porsche KG, Stuttgart-Zuffenhausen, Germany
Filed Jan. 13, 1967, Ser. No. 609,211
Claims priority, application Germany, Feb. 25, 1966, 1,580,519
Int. Cl. B60k 1/00, 17/00; F16h 1/02
U.S. Cl. 180—70         2 Claims

ABSTRACT OF THE DISCLOSURE

The present disclosure relates to a driving unit for vehicles wherein an internal combustion engine has a drive shaft connected to a change speed transmission that has an output shaft concentrically arranged about the drive shaft. A particularly advantageous quiet gear train is provided between the transmission and the differential for driving the vehicle driven wheels having axles parallel to the drive shaft and output shaft. The gear train comprises two parallel outer gears and an intermediate skewed gear. Preferably, the axes of the three gears are arranged in three mutually parallel planes and the intermediate gear axis is skewed at an angle within the range of 10 to 15°.

---

Background of the invention

The present invention concerns vehicles wherein the internal combustion engine and change speed gear transmission are arranged cross-wise to the direction of travel, with the change speed gear transmission output shaft being in constant driving engagement with the axle drive gear. Such an arrangement is shown in the United States Patent application 531,583, now Patent No. 3,399,743. For solving the noise problems for driving arrangements arranged cross-wise to the direction of travel, the above-mentioned patent application provides the transmission output shaft at an angle to the axis of the driven wheel axle gearing. The crossing of these axes allows the use of a tooth construction that is similar to the hypoid gears and which allows a specific amount of sliding at the tooth flanks of the gears to produce very quiet operation of the gear train. However, with this arrangement, an inclined mounting of the transmission and internal combustion engine or axle drive must be tolerated, which is generally objectionable, particularly in certain groups of vehicles where the freedom in arranging and deciding of the driving aggregate is severely limited. It is a general object of the present invention to provide a quiet gear train and more particularly to provide a quiet gear train for the above-mentioned environment that will not have the disadvantages relating to space requirements and inclined machine mountings.

Brief description of the invention

The present invention avoids the above-mentioned problems by providing a gear train with an intermediate gear that has an axis inclined by a substantial angle relative to the axes of the axle gear and transmission gear which are in constant driving engagement therewith. With this arrangement, the usual and preferred mounting of the transmission and internal combustion engine may be used when compared to the above-mentioned patent application. The additional cost of the intermediate gear is relatively small; with particularly large drive units and for reasons of space requirements, it may be necessary to employ an intermediate gear regardless of the present invention. It has been found particularly advantageous to provide the axes of the gear train gears in mutually parallel planes. The gear train may be arranged horizontally and/or perpendicularly, but the illustrated construction is particularly well adapted for compact drive mounting. It has been found that the most efficient and quiet driving arrangement is produced when the intermediate axis is skewed at an angle within the range of 10 to 15°.

Further objects, features and advantages of the present invention will become more apparent from the following description of the drawing.

Detailed description of the drawing

Figure 1:
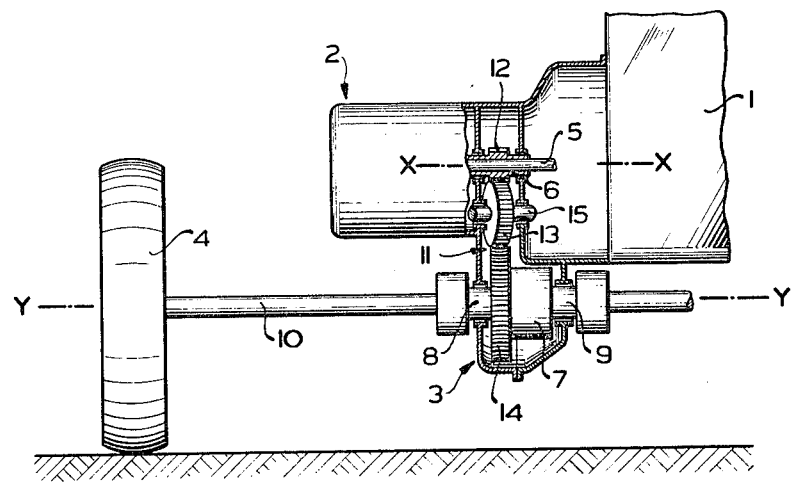
FIGURE 1 is a partial cross-sectional view with portions broken away of a vehicle drive unit with the drive mechanism arranged cross-wise to the direction of vehicle travel and somewhat schematically illustrating the present invention.

In FIGURE 1, the vehicle drive unit comprises an internal combustion engine 1 to provide the driving power for the vehicle, a change speed transmission 2 and an axle drive 3 arranged below the change speed gear transmission 2 for driving the wheels 4 (one being shown in the drawing). The internal combustion engine 1 is provided with a drive shaft 5 for driving the change speed gear transmission 2, which may be conventional. The change speed gear transmission has an output shaft 6 that is concentrically mounted about the drive shaft 5. Suitable bearings are employed for mounting the shafts 5 and 6 in the housing. The shafts 5 and 6 rotate about a common axis X—X.

The axle drive unit 3 comprises a differential cage 7 and wheel axle shafts 8, 9 that have equalizing differential bevel gears at their inner ends. The axle shafts 8 and 9 extend along an axis Y—Y and in the usual manner support the swinging independent half-axles 10 supporting the wheels 4 (only one wheel 4 being shown for simplicity).

Figure 3:
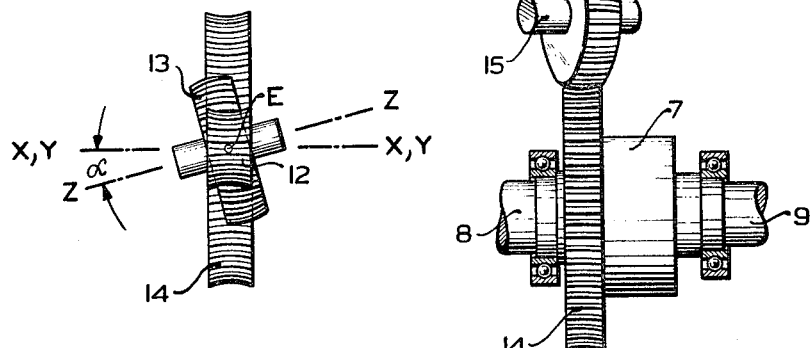
FIGURE 3 is a top view of the gear train, with portions broken away, viewed in the direction of the arrow R in FIGURE 2.
Figure 2:
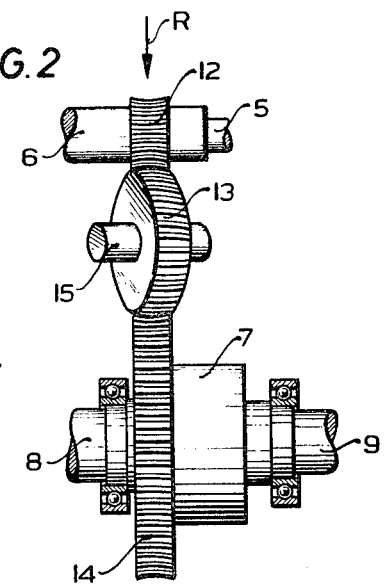
FIGURE 2 is an enlarged view of the gear train, with portions broken away, of FIGURE 1.

A constantly engaged gear train 11 is provided for transmitting power from the change speed gear transmission 2 to the axle drive unit 3. The gear train 11 comprises a first gear 12 drivingly mounted on the output shaft 6 to have a first axis X—X that is the same for the shafts 5 and 6, an intermediate gear 13 that is engaged with the gear 12 and is mounted on the shaft 15 which has an intermediate axis, and a second gear 14 in engagement with the gear 13 and in driving engagement with the differential cage 7 so that it rotates about the axis Y—Y. Preferably, the axes Y—Y and X—X are parallel as shown in FIGURES 1 and 3. As shown in FIGURE 3, the intermediate axis of the intermediate gear 13 and its shaft 15 forms an angle α with respect to the axes X—X and Y—Y. Preferably, the axes X—X, Y—Y, and Z—Z are arranged in mutually parallel planes. Also, it is preferable that the axis Z—Z intersects and bisects a line drawn between the center of engagement for the gears 12, 13 and the center of engagement for the gears 13, 14. With these intersecting axes, hypoid gears may be employed for the gears 12–14, or modified worm gears may be employed, so that there is a sliding tooth continuous engagement for producing a particularly quiet gear train drive. Most favorable results in regard to quietness of operation have been obtained when the angle α is about 10 to 15°.

Broadly, the gear train of the present invention may have general utility to produce quiet power transmission; however, this gear train has particularly desirable and advantageous results when used in the above described embodiment for which it is specifically designed, as set forth above. Although a particularly space saving arrangement is obtained when the shafts 5 and 6 are concentric with each other, it is also contemplated that the shafts 5 and 6 may be parallel with respect to each other.

The above preferred embodiment with its variations and modifications has been set forth in detail as a particularly advantageous construction of the present invention; however, additional embodiments, modifications and variations are contemplated.

I claim:

1. A drive unit for the driven wheels of a motor vehicle, comprising: block means disposed between the driven wheels and including an internal combustion engine having an axis of rotation generally at right angles to the direction of travel; change speed transmission means having an output shaft parallel to said axis or rotation and operatively driven by said engine; axle gear means for driving said driven wheels being spaced from said transmission means and said block means, and having a rotational axis generally parallel to said axis of rotation; continuously meshing connecting gear means drivingly connecting said change speed transmission means with said axial gear means; said connecting gear means including a toothed output driving first gear having a first axis of rotation, a toothed driven second gear constantly engaging said first gear with a first center of engagement and having a second axis of rotation, and a toothed axle gear input driven third gear constantly engaging said second gear with a second center of engageent and having a third axis of rotation; said first and third axes of rotation being parallel and defining a first plane; said second axis of rotation being angularly inclined with respect to said first plane so that a second plane passing through the first and second centers of engageent and said second axis of rotation intersects said first plane at an acute angle along a line generally passing through said centers of engagement; said first, second and third axes of rotation having mutually parallel and spaced planes extending therethrough and generally perpendicular to said line of intersection; said driving and driven gears each having a plurality of separate spaced gear teeth around their periphery; said teeth being generally cylindrically oriented with respect to their corresponding axes of rotation; wherein said first and third gears have a concave tooth profile as seen in cross section in a plane through said first and third axes, respectively, and said second gear has a mating convex tooth profile as seen in cross section in a plane through said second axis of rotation.

2. The drive unit according to claim 1, wherein said angle of intersection is within the range of 10 degrees to 15 degrees.

References Cited
UNITED STATES PATENTS

| | | | |
|---|---|---|---|
| 593,702 | 11/1897 | Thomas | 74—416 X |
| 2,090,123 | 8/1937 | Hoffman | 180—54 X |
| 2,095,491 | 10/1937 | Beare | 74—412 |
| 2,531,268 | 11/1950 | Herrington | 180—42 |
| 3,262,331 | 7/1966 | Breuer | 74—412 |
| 3,302,740 | 2/1967 | Giacosa | 180—42 |

A. HARRY LEVY, Primary Examiner

U.S. Cl. X.R.

74—412; 180—55